United States Patent
Vail, III

(10) Patent No.: US 6,450,028 B1
(45) Date of Patent: Sep. 17, 2002

(54) PRECISION GRAVITY GRADIOMETER OPTICALLY MEASURING DENSITY VARIATIONS IN GASES

(76) Inventor: William Banning Vail, III, 3123-198th Pl. SE., Bothell, WA (US) 98012

( * ) Notice: Subject to any disclaimer, the term of this patent is extended or adjusted under 35 U.S.C. 154(b) by 0 days.

This patent is subject to a terminal disclaimer.

(21) Appl. No.: 09/484,981

(22) Filed: Jan. 18, 2000

Related U.S. Application Data

(63) Continuation-in-part of application No. 08/927,551, filed on Sep. 6, 1997, now Pat. No. 6,014,895.

(51) Int. Cl.$^7$ ................................................ G01V 7/04
(52) U.S. Cl. ........................................................ 73/382 G
(58) Field of Search ........................... 73/382 G, 382 R, 73/30.01, 30.02, 30.04

(56) References Cited

U.S. PATENT DOCUMENTS

| | | | | |
|---|---|---|---|---|
| 4,602,508 A | * | 7/1986 | Fitch et al. ............... | 73/382 G |
| 6,014,895 A | * | 1/2000 | Vail ......................... | 73/382 R |

* cited by examiner

Primary Examiner—John E. Chapman

(57) ABSTRACT

Precision gravity gradiometers and precision differential gravimeters are described. The instruments possess a gaseous medium comprised of molecules that scatter light from typically a laser light source. These molecules may be large molecular scattering structures that include assemblages of tungsten atoms surrounded by fluorine atoms that strongly scatter light. Measurements of variations in the density of the gaseous medium in a gravitational field are used to determine the gravity gradient. Great sensitivity exceeding 1 part in $10^{10}$ are obtained that may be used to measure gravity in a variety of environments. Measurements may be performed in a borehole in the earth and on the earth's surface. The precision gravity gradiometer may be used in a laboratory as a test instrument having the required sensitivity to test certain fundamental laws of physics.

4 Claims, 1 Drawing Sheet

PRECISION GRAVITY GRADIOMETER OPTICALLY MEASURING DENSITY VARIATIONS IN GASES

This is a continuation-in-part of application Ser. No. 08/927,551, filed Sep. 6, 1997, now U.S. Pat. No. 6,014,895 that issued on Jan. 18, 2000, having the title of "Determination of Gravity by Observation of Density Variations in Gases", an entire copy of which is incorporated herein by reference.

Portions of this application were disclosed in the U.S. Disclosure Document No. 423741 entitled "Precision Measurements of Gravity by Observation of Density Variations in Materials" that was mailed to the USPTO on the date of Aug. 26, 1997 using a Certificate of Deposit by "Express Mail", an entire copy of which is incorporated herein by reference.

BACKGROUND OF THE INVENTION

1. Field of the Invention

The field of the invention relates to apparatus to measure gravity. The field of the invention also relates to methods of operation of the apparatus to measure gravity. The field of the invention further relates to apparatus adapted to perform measurements of gravity from within a borehole in the earth. The field of the invention also relates to methods of operation of apparatus adapted to perform measurements of gravity from within the borehole in the earth. The field of the invention further relates to precision differential gravimeters and precision gravity gradiometers. And finally, the field of invention relates to new materials comprised of tungsten fragments surrounded by fluorine atoms.

2. Description of the Prior Art

It is well known in the geological sciences that measurements of gravity within a borehole could be used to locate and quantitatively identify the amount of gas present in a hydrocarbon bearing reservoir. However, the present state-of-the-art apparatus do not provide sufficiently accurate measurements of gravity in boreholes to be widely used on a routine commercial basis. Further, the present state-of-the-art apparatus are not capable of performing measurements rapidly enough, or fast enough, for routine commercial services. For example, please refer to the book entitled "Applied Geophysics", by W. M. Telford, L. P. Geldart, R. E. Sheriff, and D. A. Keys, Cambridge University Press, Cambridge, reprinted in 1981, an entire copy of which is incorporated herein by reference, and in particular please refer to page 803. It is also well known to researchers at Gas Research Institute (GRI) located in Chicago, Ill. that present devices to measure gravity within boreholes are generally inadequate for routine widespread commercial operations. GRI's present standard publicly available scientific papers and reports on gravity measurements are incorporated herein in their entirety by reference herein.

For the purposes of this application, standard geophysical terms are used such as those appearing in the following references, entire copies of which are incorporated herein by reference: (a) the book entitled "Essentials of Modern Open-Hole Log Interpretation", by John T. Dewan, PennWell Publishing Company, Tulsa, Okla., 1983; (b) the book entitled "Cased Hole Log Interpretation Principles/Applications", by the "editor", Schlumberger Educational Services, Houston, Tex., 1989; and (c) the book entitled "The Illustrated Petroleum Reference Dictionary", Third Edition, by Robert D. Langenkamp, PennWell Publishing Company, Tulsa, Okla., 1985.

At the time of the filing of the application herein, the applicant is unaware of any prior art that is particularly relevant to the invention.

SUMMARY OF THE INVENTION

An object of the invention is to provide apparatus to provide sufficiently accurate measurements of gravity to be useful for routine measurements of gravity from within a borehole in the earth to locate and quantitatively identify the amount of gas present. Another object of the invention is to provide methods of operation of the apparatus to provide sufficiently accurate measurements of gravity to be useful for routine measurements of gravity from within a borehole in the earth to locate and quantitatively identify the amount of gas present.

Yet another object of the invention is to provide apparatus to provide sufficiently accurate measurements of gravity rapidly enough to be useful for routine measurements of gravity from within a borehole in the earth to locate and quantitatively identify the amount of gas present. And finally, another object of the invention is to provide methods of operation of the apparatus to provide sufficiently accurate measurements of gravity rapidly enough to be useful for routine measurements of gravity from within a borehole in the earth to locate and quantitatively identify the amount of gas present.

Yet further, another object of he invention is to provide new methods and apparatus to provide a precision differential gravimeter, also called a precision gravity gradiometer, for measurements of gravity on the surface of the earth, and as a scientific test instrument to test the relevant fundamental laws of physics.

And finally, another object of the invention is to provide new materials comprised of tungsten hexafluoride molecules, and tungsten fragments surrounded by fluorine atoms, to be used in the precession differential gravimeter for precision methods of gravity on the surface and as a test instrument to test the limits of relevant laws of physics.

DESCRIPTION OF THE PREFERRED EMBODIMENTS

Figure 1:
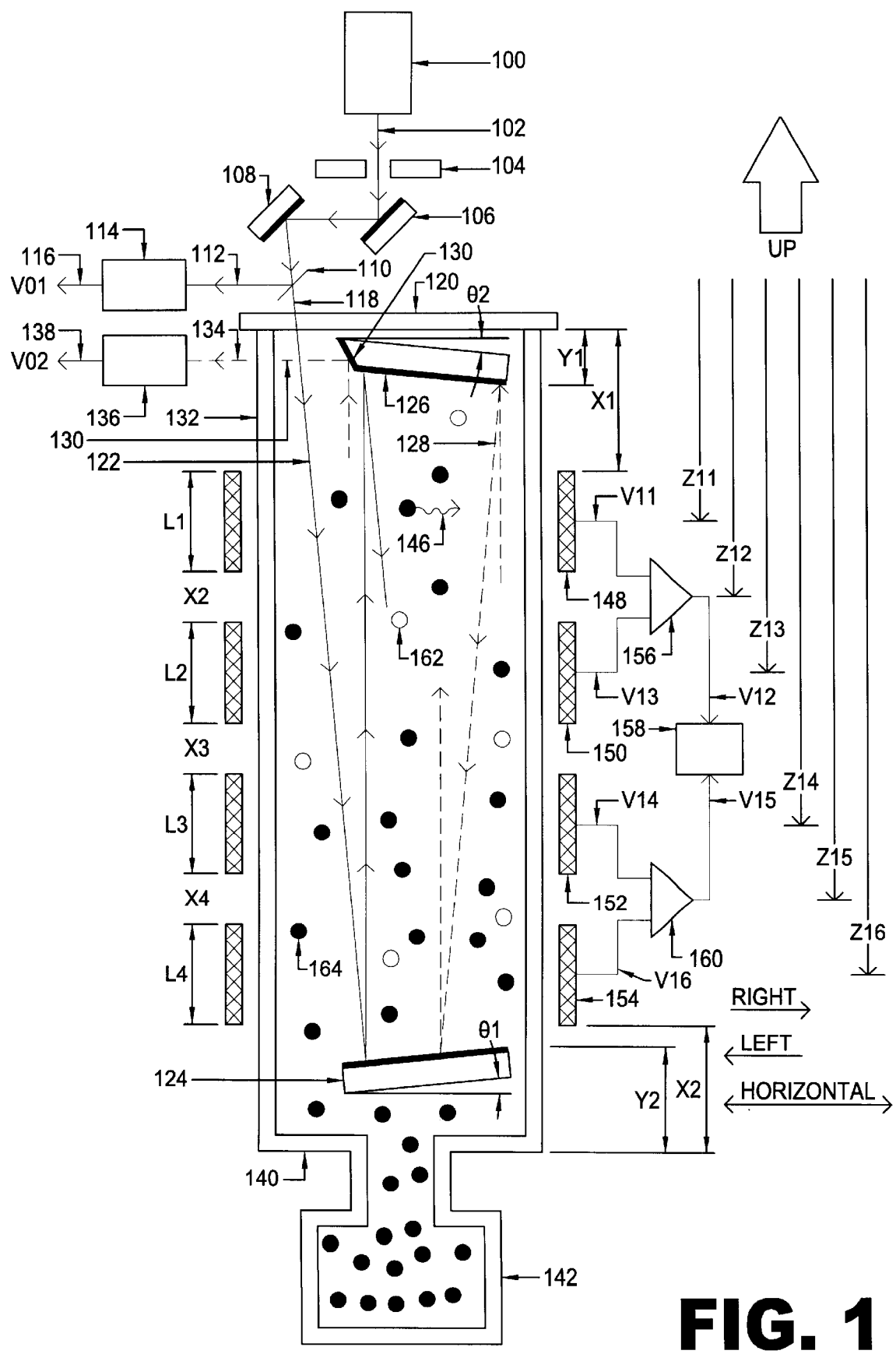
FIG. 1 shows a section view of an apparatus to measure gravity within a borehole, that is also a precision differential gravimeter which is also called a precision gravity gradiometer.

Please refer to FIG. 1 that shows a section view of one of the preferred embodiments of the invention. Laser 100 puts out a laser beam 102 having at least one wavelength that proceeds through a an optical chopper 104 that reflects from first mirror 106 that proceeds to second mirror 108 that impinges on beam splitter 110. A first portion of the laser beam 112 having intensity I01 impinges on the first reference detector 114 having voltage output 116 that is voltage V01. A second portion of the laser beam 118 proceeds through transparent window 120. Once passing through transparent window 120, a portion of the laser beam 122 travels toward the lower cavity mirror 124. Laser beam 122 then reflects off the lower cavity mirror 124 towards the upper cavity mirror 126. The lower cavity mirror 124 is tilted through angle $\theta 1$ with respect to the horizontal and upper cavity mirror 126 is tilted through angle $\theta 2$ with respect to the horizontal such that the laser beam undergoes multiple reflections to and from each respective cavity mirror. The angles are adjusted such that the laser beam that initially traveled to the right "turns around" and begins to travel towards the left upon multiply reflecting to and from each cavity mirror. The inventor has used a similar multi-reflection geometry in an apparatus that measured the Polar Reflection Faraday Effect and such multiple-reflection geometries work in practice. In the end, if all the laser light had not been absorbed by gases within the instrument, then the final beam reflects from surface 130 and passes through transparent tube 132 as laser beam 134 having intensity I02 that impinges on second reference detector 136 having voltage output 138 that is voltage V02.

Transparent window 120, transparent tube 132, lower wall 140 and molecular source 142 comprise a vacuum tight system hereinafter designated as the "vacuum tight cavity". A resonant absorbing molecular structure 144 is in gaseous form within the vacuum tight cavity in the preferred embodiment shown in FIG. 1. The acronym "AMS" shall be used to denote the abbreviation for the term "absorbing molecular structure". It can be either singular or plural as the case may be.

In many preferred embodiments of the invention, the AMS is comprised of one or more atoms forming an "assemblage of atoms". In another preferred embodiment of the invention, at least one fluorescent dye molecule is incorporated within, or is attached to the assemblage of atoms. Each assemblage of atoms comprising the AMS has the mass defined by the symbol M(AMS). In this preferred embodiment, the AMS with its attached fluorescent dye molecule resonantly absorbs the laser light output from laser 100. This light is absorbed in at least one wavelength that the laser is generating. Put another way, each AMS "fluoresces" after laser light is absorbed. Here, M(AMS) means the total mass of the assemblage that includes the mass of any fluorescent dye molecule that may be attached to other atoms (or assemblages of atoms) such as to bismuth, lead, mercury, etc. In different embodiments, any assemblage of atoms from one or more portions of the periodic chart may be used. It should also be noted that such above described fluorescent molecules are used in the biotechnology industry as biological markers. Such molecular structures are also used in research involving 3-D optical memory devices.

A photon released by an AMS after it "fluoresces" is shown as element 146 in FIG. 1.

A first cylindrical detector 148 of radius r1 (not shown) surrounds transparent tube 132 that measures light. It has length L1 and is centered at depth Z11.

A second cylindrical detector 150 of radius r1 (not shown) surrounds transparent tube 132 that measures light. It has length L2 and is centered at depth Z13.

A third cylindrical detector 152 of radius r1 (not shown) surrounds transparent tube 132 that measures light. It has length L3 and is centered at depth Z14.

A fourth cylindrical detector 154 of radius r1 (not shown) surrounds transparent tube 132 that measures light. It has length L4 and is centered at depth Z16.

The voltage output from the cylindrical detector 148 is V11 that is one input into differential amplifier 156. The voltage output from cylindrical detector 150 is V13 that is the other input into differential amplifier 156. The output of differential amplifier 156 is V12 which is an input to processor 158.

The voltage output from the cylindrical detector 152 is V14 that is one input into differential amplifier 160. The voltage output from cylindrical detector 154 is V16 that is the other input into differential amplifier 160. The output of differential amplifier 160 is V15 which is another input to processor 158.

To improve the response time of the instrument, a light, fast gas molecule 162, such as helium, may be introduced into the vacuum tight cavity. Any such light molecule has mass M(TH), for "thermalization". However, the device will work with just one molecular species or with many different molecular species mixed together. The invention has many variants.

The average temperature T and pressure P in the vacuum tight cavity are also measured and forwarded to processor 158. In other preferred embodiments, sensors are provided to measure the temperatures and pressures at many different points within the vacuum tight cavity. However, the temperature and pressure sensors are not shown in FIG. 1 for simplicity.

Not shown in FIG. 1 are the typical elements of the phase sensitive detection system that the inventor typically uses for most precision measurements and which are widely understood in the industry. A voltage reference source (not shown in FIG. 1) is used to drive a power amplifier (not shown in FIG. 1) that in turn is used to drive the optical chopper 104. That voltage reference source is also provided as another input to the processor 158 for timing purposes (not shown in FIG. 1). Typical phase sensitive detection techniques can then be used to reduce any noise present in the system. The above are not shown in FIG. 1 for the purposes of simplicity only.

From the physics involved, and to first order, it is evident that:

$$(V13-V11)/V01 = \eta g(Z12)$$ Equation 100.

Here, $g(Z12)$ is the acceleration of gravity measured by cylindrical sensors 148 and 150 at the position Z12. The parameter $\eta$ is related to at least the pressure, temperature, the masses present, the details of the geometry of the detectors, and other factors as well.

Again, to first order, it is evident that:

$$(V16-V14)/V01 = \eta g(Z15)$$ Equation 101.

Here, $g(Z15)$ is the acceleration of gravity measured by cylindrical sensors 152 and 154 at the position Z15. It is assumed here that the apparatus is designed so that $\eta$ is the same for Equations 100 and 101.

So, subtracting Equation 100 from Equation 101:

$$\{g(Z15)-g(Z12)\}\eta = \{(V16-V14)/V01\} - \{(V13-V11)/V01\}$$ Equation 102.

Now, for a few definitions:

$$\delta g = g(Z15) - g(Z12)$$ Equation 103.

$$k = 1/\eta$$ Equation 104.

$$\delta v = \{(V16-V14)/V01\} - \{(V13-V11)/V01\}$$ Equation 105.

$$\delta g = k \delta v$$ Equation 106.

Now, another definition:

$$\delta z = Z(15) - Z(12)$$ Equation 107.

Then, Equation 106 becomes:

$$\delta g/\delta z = k \delta v/\delta z$$ Equation 108.

The quantity $\delta g$ is "the change in gravity". The quantity $\delta z$ is the change in position along the axis of the measurement apparatus. If the axis of measurement apparatus is oriented vertically, then the quantity $\delta z$ is the change in vertical position. The quantity $\delta g/\delta z$ in Equation 108 is literally the change in gravity per change along the axis of the measurement apparatus. The quantity $\delta g/\delta z$ is defined as the "gravity gradient". If the axis of the measurement apparatus is oriented vertically, then the quantity $\delta g/\delta z$ in Equation 108 is the change in gravity per change in vertical position. For the purposes herein, an instrument that measures $\delta g/\delta z$ is defined for the purposes herein to be a "precision differential gravimeter", that is also called equivalently herein a "precision gravity gradiometer". This quantity $\delta g/\delta z$ may be a scalar quantity if one sensor is used, or a vector quantity having three components if three sensors are used.

Equation 108 looks the same as Equation 17 in the earlier U.S. Disclosure Document in the portion of that document dated Jul. 24, 1997. However, here, the measured quantities are different. In the previous case, optical rotation, and not absorption, was measured. In this case, fluorescence is measured. It is worthwhile to note that Equation 108 is only correct to first order, and it is likely that higher order errors need to be considered carefully in later analysis.

Another embodiment of the invention has the upper and lower cavity mirrors 126 and 124 respectively designed to permanently trap the laser beam so that it bounces back and forth endlessly until the radiation is entirely absorbed by the molecules (and in part by the surfaces of the mirrors). There is a trade-off between the number of repetitive passes through the gas and the M(AMS).

If the laser made only one single pass, then M(AMS) would have to be very heavy for a cell 1 meter long to work well. Perhaps M(AMS) would each have to have the mass of several thousand lead atoms. However, with increasing number of passes, there is a decrease in the required mass M(AMS).

A coordinate system may be easily established with respect to elements shown in FIG. 1 that is used to describe the position of any AMS within the "vacuum tight cavity" defined above. Any distance above the interior portion of lower wall 140 shall be called the vertical position "z" that is not shown in FIG. 1 for the purposes of simplicity. The axis of the laser beam 102 as it emerges from laser 100 is along the hypothetical "center-line" of the transparent tube 132, although that "center-line" is not shown in FIG. 1 for the purposes of simplicity. At any vertical position z, and using typical cylindrical coordinates, a particular AMS may be at radius r from that center-line and at angle $\phi$. The "zero" in the angle $\phi$ may be conveniently chosen such as by setting it equal to the direction of the first reference detector 114 as an example. For the purposes of simplicity, r and $\phi$ are not shown in FIG. 1. The point of this is that any AMS may be uniquely located at any position within the "vacuum tight cavity" by specifying z, r, and $\phi$.

The relative fractional probability P of a given mass M(AMS) being at position z within the vacuum tight cavity is given by a version of the Boltzmann distribution, an approximation of which is given as follows:

$$P = (1 - e^{-\{M(AMS)g\,z/k\,T\}}) \qquad \text{Equation 109.}$$

For additional details, please refer to the book entitled "Handbook of Physics", Second Edition, by B. Yavorsky and A. Detlav, MIR Publishers, Moscow, USSR, 1975, an entire copy of which is incorporated herein by reference, and please see page 228 in particular. Another form of the above equation results in the so-called "barometric height formula".

In Equation 109, P is the relative fractional probability and is dimensionless (a numerical fraction). In Equation 109, M(AMS) and z have already been previously defined. The quantity g is the acceleration of gravity or 9.80 meters/sec² on the surface of the earth. The quantity k is the Boltzmann constant that is $1.38 \times 10^{-23}$ Joules/° K. These constants and the related definitions appear in the book entitled "Physics", Parts I and II, Combined Third Edition, by David Halliday and Robert Resnick, John Wiley & Sons, Inc., 1978, an entire copy of which is incorporated herein by reference.

As an example, applicant will choose a mass M1(AMS) having about 2000 times the weight of a lead atom. Lead has an atomic weight of about 207.2 (see the book entitled "Handbook of Chemistry and Physics", 61st Edition, by the "Editor", CRC Press, Inc., Boca Raton, Fla., 1981, an entire copy of which is incorporated herein by reference). Using an approximation that the mass of lead is equal to the atomic weight times the rest mass of a proton:

$$M1(AMS) = (2{,}000)(207.2)1.67 \times 10^{-27} \text{ kilograms} = 6.92 \times 10^{-22} \text{ kilograms} \qquad \text{Equation 110.}$$

For borehole measurements, the temperature is typically 100 degrees C or 373° K. Therefore, at this temperature, the exponential factor in Equation 109 becomes:

$$\{M1(AMS)g\,z/k\,T\} = 1.32\,z/\text{meter} \qquad \text{Equation 111.}$$

For these numbers, and if the vacuum tight cavity were sufficiently long to have z=1.0 meters, then the relative probability P of M1(AMS) being at the position of z=1.0 meters compared with z=0 meters, is given by:

$$P = (1 - e^{-\{1.32\}}) = 0.27 \qquad \text{Equation 112.}$$

So, at z=0, there are roughly 4 times as many atoms per unit volume having mass M1(AMS) as at z=1 meter.

It is evident that there is a Characteristic Length L in this problem given by:

$$M1(AMS)g/k\,T = 1/L \qquad \text{Equation 113.}$$

The Characteristic Length L has the units of meters. In terms of the design of the apparatus in FIG. 1, it is evident that the longer L, then the more reflections would be required to make devices of equivalent sensitivity—all other factors being equal.

At any given position with the vacuum tight cavity specified by z, r, and $\phi$, different parameters may be used to describe the distribution of masses M(AMS).

The number of masses per unit volume at any position within the vacuum tight cavity may be specified. If mixtures of gases are used, the particular number of masses of any given type per unit volume at any position may be specified. For the purposes herein, the term "the distribution of masses" shall mean the specification of the number of masses, and the specification of the different types of masses present, per unit volume at any given position within the vacuum tight cavity.

As an example, if 3 different masses were used, respectively 2000 times the weight of lead, 100 times the weight of lead, and helium atoms, then the distribution of masses at a given location within the vacuum tight cavity would specify the masses present per unit volume at the particular location.

For the purposes herein, the term "density variations" shall mean the determination of any differences between a first distribution of masses at a first location within the vacuum tight cavity and a second distribution of masses at a second location within the vacuum tight cavity. Therefore, in a precision gravity gradiometer, density variations are measured to determine the gravity gradient. In a precision differential gravimeter, density variations are measured to determine the gravity gradient.

For the purposes herein, different masses may also be called "different species".

In simple systems, the "mass distribution" is the mass per unit volume at any given position within the vacuum tight cavity. In principle, the invention will work with any mass distribution. Even liquids can be used, but the "settling time" following shock in a borehole may preclude the routine use of fluids to measure gravity. However, judiciously chosen mass distributions in accordance with the above may increase the sensitivity of one embodiment of the invention compared to another.

It is generally known in the geophysics literature that measurement of gravity to a sensitivity of 1 part in $10^{10}$ of the acceleration of gravity on the surface of the earth is sufficient accuracy for widespread use. In bright sunlight, the photon flux density is on the order of $10^{21}$ photons/ meter$^2$ per second (please refer to the book entitled "Optics", by Eugene Hecht and Alfred Zajac, Addison-Wesley Publishing Company, Menlo Park, Calif., 1979, an entire copy of which is incorporated herein by reference, and in particular please see page 56). Using the "square root of N over N" type counting statistics, this level of brightness can yield measurements that are accurate to about 1 part in $10^{10}$ in one second! Of course, lasers are much, much brighter than sunlight, so that the invention will provide sufficiently accurate measurements of gravity to be useful for routine measurements of gravity from within a borehole in the earth to locate and quantitatively identify the amount of gas present.

As an example of a calculation of the required energy delivered to an optical detector, it is useful to note that the center of the optical spectrum is at the wavelength of about 550 nano-meters. Using Planck's constant, and typical equations for light, the energy of a single photon at this wavelength is computed to be 3.62 $10^{-19}$ Joules. For such calculations, see pages 893 and 1099 of the book entitled "Physics", Parts I and II, Combined Third Edition, by David Halliday and Robert Resnick, op cit. So, a beam of about 3 watts impinging on a detector intrinsically has information available to an accuracy of 1 part in $10^{10}$ as stated above. So, lasers with about 20 watts of output power would be ideal for an embodiment of the invention shown in FIG. 1.

Furthermore, it is evident that the accuracy of precision differential gravimeter in FIG. 1 may be increased by increasing intensity of laser light. In such embodiments of the invention, the accuracy may be increased sufficiently thereby superseding the sensitivity of presently known precision differential gravimeters or precision gravity gradiometers. Such increased accuracy of measurement are useful for the purposes of commercial measurements of gravity on the surface of the earth. Such increased accuracy of measurement is also useful to test the relevant fundamental laws of physics, including the theory of special relativity, the theory of general relativity, and other theories related to a unified field theory, a quantum theory of particles, quantum fluctuations, gravitons, string theory, and M theory, terms that are routinely used in relevant physics texts and publications, and which also appear in the public press. For example of such usage in the public press, please refer to the issue of Time Magazine, entitled "Person of the Century, Albert Einstein", Dec. 31, 1999, Vol. 154, No. 27, an entire copy of which is incorporated herein by reference, and please see pages 48–95 in particular.

Returning to measurements within boreholes, embodiments of the invention will be largely immune to vibrations and movements downhole. This would be a great improvement over any of the current devices now in use that require stationary, long term measurements. It is hoped that vibrations will appear to the measurement system as just one more means of "thermalization" such as that caused by a helium atom.

Other vibration isolation systems may be used with the invention as well to "shock isolate" the vacuum tight cavity. For example, such shock isolation systems that may be used in conjunction with various embodiments include that shown in FIG. 4 of U.S. Pat. No. 4,602,508, that issued on Jul. 29, 1986 to the inventors of Fitch, et. al, that is entitled "Continuous Gravity Gradient Logging", an entire copy of which is incorporated herein by reference. The shock isolation system in FIG. 4 of U.S. Pat. No. 4,602,508 provides for both shock isolation, and for thermal isolation because this patent states in part on page 2, lines 8–11, "Temperature is maintained constant along the column by an externa lead absorber or by a heat absorbing element located within the column itself." Other temperature regulating means are also described in U.S. Pat. No. 4,602,508 that may be used in conjunction with various preferred embodiments of the invention. Other art in the industry is assumed including that described in U.S. Pat. Nos. 2,925,007; 3,011,347; 3,855,845; 3,618,061; and 4,513,618; entire copies of which are incorporated herein by reference.

In the end, certain embodiments of the invention will provide sufficiently accurate measurements of gravity rapidly enough to be useful for routine measurements of gravity from within a borehole in the earth to locate and quantitatively identify the amount of gas present.

FIG. 1 presents the apparatus in a substantially "vertical" position. Equation 108 properly predicts that the output of the device will be a relative zero if the device in FIG. 1 is placed horizontally. The invention will have a reasonable response if it is oriented along any axis having angle ω with respect to the vertical direction. However, the details of that response will be dependent upon many factors including at least the angle a, the geometry of the vacuum tight cavity, and the path of the laser light. In principle, three such devices as shown in FIG. 1 may be oriented with respect to one-another so that all three components of gravity with respect to the axis of orientation of the apparatus may separately and individually measured. The word "gradiometer" in several embodiments refer to one measurement made along the axis of the orientation of the apparatus, and in other embodiments, refers to the measurements of all three components of gravity separately and individually with respect to the axis of orientation of the apparatus.

The actual sensitivity of the device in FIG. 1 is related at least to the intensity of the laser, the optical absorption cross section of the AMS, the distribution of masses within the vacuum tight cavity, the Characteristic Length L, the geometry of the cylindrical detectors, the efficiency of the cylindrical detectors to detect the light (their quantum efficiency), the geometry of the vacuum tight cavity, its orientation in the Earth's gravitational field, among many other parameters.

Many of the preferred embodiments described to this point have made use of the "AMS", or "absorbing molecular structures". The AMS may be chosen to absorb light at one wavelength or an many wavelengths. Equivalently, the AMS may be chose to absorb light at one frequency or at many frequencies. In other preferred embodiments of the invention, the laser 100 produces many different wavelengths, and the AMS absorbs one or more of those wavelengths.

Many of the preferred embodiments described to this point have made use of the "AMS" having a fluorescent dye attached to it. However, such dye taggants may not be necessary. Under ideal circumstances, the chemicals comprising the AMS will resonantly absorb light at the same wavelength, or at several of the wavelengths, provided by the laser. As an example, a laser using neodymium as a part of its lasing material can be used and the AMS can contain one or more neodymium atoms. As another example, a laser using krypton as a part of its lasing material can be used and the AMS can contain one or more krypton atoms. As yet another example, a laser using cadmium as part of its lasing material can be used and the AMS can contain one or more cadmium atoms.

It must be emphasized that the AMS need not physically actually absorb light and re-emit it for the invention to work. In other words, it is NOT necessary for the AMS to "fluoresce". In fact, any type of light scattering, or light absorption and re-radiation process, or naturally occurring radiation process of any type may be used to measure gravity with the invention. For the purposes herein, these methods are all called "optical processes". For the purposes herein, the devices that use the "optical processes" as methods of operation are called "optical means". Many different types of optical processes may be used to measure gravity with the invention, and several of the different optical processes are described in the following references, entire copies of which are incorporated herein by reference: (a) the book entitled "Handbook of Optics", edited by Walter G. Driscoll and William Vaughan, McGraw-Hill Book Company, New York, N.Y., 1978; (b) the book entitled "Optics", by Eugene Hecht and Alfred Zajac, 1979, op. cit.; (c) the book entitled "Introduction to Modern Optics", by Grant R. Fowles, Holt, Rinehart and Winston, Inc., New York, N.Y., 1968; and (d) the book entitled "Modern Optical Engineering, The Design of optical Systems", by Warren Smith, "Modern Optical Engineering, McGraw-Hill Book Company, New York, 1966.

It is also worth mentioning that the AMS must not optically block transparent window 120 and any portion of the transparent tube 132 adjacent to the first reference detector 114, adjacent to the second reference detector 136, or adjacent to the respective cylindrical detectors 148, 150, 152, and 154 shown in FIG. 1. The AMS must not block, or coat the portions of the embodiment in FIG. 1 when optical light is being measured. This is not an unusual situation. For example, similar problems were encountered in the development of rubidium optical pumping magnetometers wherein in very early prototype instruments, rubidium would block or coat portions of the optical sensors. As it turns out, the selective use of heaters on various portions of the optical elements, and the use of buffer gases, such as helium, were used to keep similar portions of the sensors for optical pumping magnetometers transparent as desired. Similarly techniques and methods shall be used in the embodiment of the invention in FIG. 1 to prevent undesirable coating or blocking of the optical beams, although those techniques are not shown in FIG. 1 for the purposes of brevity.

In the second paragraph above this one, it states "In fact, any type of light scattering, or light absorption and re-radiation process, or naturally occurring radiation process of any type may be used to measure gravity with the invention." The preferred embodiments described at this point relate to methods, apparatus, and materials to scatter light in the apparatus in FIG. 1. Element 144 that is an "absorbing molecular structure" or AMS in FIG. 1 of Ser. No. 08/927,551 has been replaced in FIG. 1 herein with element 164 that is a "molecular scattering structure". The molecular scattering structure is a gaseous medium comprised of gas molecules that scatter light from the laser 100 in FIG. 1.

Very heavy molecular scattering structures that remain gaseous or gaseous-like are preferred to enhance sensitivity of the precision gravity gradiometer. Applicant had personal experience during the time span of 1974–1977 with tungsten hexafluoride gas in an apparatus resembling the famous Millikan oil-drop apparatus during a then novel, and vain, search for quarks. Since tungsten is a relatively heavy atom, it is noted that surrounding tungsten with fluorine atoms, or fluorine molecules, makes tungsten hexafluoride which is a gas. Apparently, the very strong repulsive forces between the fluorine molecules result in tungsten fluoride being a gas. Evidently, the 6 fluorine atoms apparently tightly pack around the single tungsten atom in this case. However, if an approximately symmetric particle of tungsten were entirely surrounded by fluorine atoms, it is expected by applicant that such structures would be a gas or gas-like substance having at least some gaseous properties. Accordingly, and in the following, there are total of 6 enumerated embodiments that describe how heavy molecular scattering structures may be fabricated from assemblages of tungsten atoms surrounded by fluorine atoms. Such heavy molecular scattering structures may be constructed from tungsten particles surrounded by fluorine atoms.

In a first embodiment of the invention to make molecular scattering structures from assemblages of tungsten atoms surrounded by fluorine atoms, please refer to the following: (a) the paper entitled "Impact and Explosion Crater Ejecta, Fragment Size, and Velocity", by John D. O'Keefe and Thomas J. Ahrens, in the journal entitled "ICARUS", Volume 62, No. 2, May 1985, pages 328–338, an entire copy of which is incorporated herein by reference; and (b) to the paper entitled "The Size Distributions of Fragments Ejected at a Given Velocity from Impact Craters", by John D. O'Keefe and Thomas J. Ahrens, International Journal of Impact Engineering, Volume 5, pages 493–499, 1987, an entire copy of which is incorporated herein by reference. These papers relate to studies of the asteroid impact that is theorized to have caused the extinction of the dinosaurs as described in the video TV transmission shown on The Learning Channel (TLC) on about Aug. 29, 1999 entitled "Crater of Death", an entire copy of the text of which is incorporated herein by reference. That video showed a hypersonic ballistic gun at the California Institute of Technology and similar apparatus elsewhere. The point is that machines exist for generating metallic fragments and causing them to impact at high velocities into a target. For the embodiment herein, a heavy molecular scattering structure may be fabricated as follows: (a) accelerate a tungsten projectile to impact a tungsten target using a hypersonic gun apparatus or equivalent; (b) surround the tungsten target with heated fluorine gas, preferably hot, ionized fluorine gas; (c) following impact, the ejected fragments of assemblages of tungsten atoms will pass through the heated fluorine gas; (d) and thereafter molecular scattering structures comprised of assemblages of tungsten atoms surrounded by fluorine gas will be produced. Adjustment of the parameters including the temperature and pressure of the gas will allow the ejected particles to form into approximately "spherical droplets" or "smooth particles" which may then be surrounded by fluorine atoms to make a gas or gas-like substance. Perhaps irregular surfaces on particles will work as well. Perhaps the target is also heated to very high temperatures before impact.

The created assemblages of atoms may be separated using typical mass separation techniques used in the chemical industries including processes based on the diffusion of such assemblages; processes based upon charging the assemblages and then separating them in magnetic fields, the separation being related to the charge "e" and the mass "m", widely known as "e/m" separation techniques; and processes based upon gravity separation in the chlorine gas. In principle, any assemblage of atoms may be created with such an impact apparatus, having suitable projectiles, targets, surrounding gases, stable temperature and pressure controls, etc.

In a second embodiment of the invention to make molecular scattering structures from assemblages of tungsten atoms surrounded by fluorine atoms, please refer to the body of literature on arc lamps. For example, one type of tungsten arc lamp is described in the book entitled "Handbook of Optics", edited by Walter G. Driscoll and William Vaughan, 1987, op. cit., and please see the section entitled "28. Tungsten-Arc (Photomicrographic) Lamp)" on page 3–47 as just one example. There are many varieties of lamps wherein one portion of the lamp is made of heated tungsten and this portion evaporates on use. For the embodiment herein, a heavy molecular scattering structure may be fabricated as follows: (a) heat a portion of a tungsten arc lamp so that the portion evaporates during operation; (b) introduce into the tungsten arc lamp fluorine gas, preferably hot ionized fluorine gas; (c) as the tungsten lamp evaporates, atomic assemblages of tungsten atoms become surrounded by fluorine atoms to make molecular scattering structures from assemblages of tungsten atoms surrounded by fluorine atoms. However, it may help to "overvoltage" such arc lamps to produce larger fragments, which brings up the next embodiment of the invention. It may also help to introduce transients into such lamps such as voltage transients, current transients, heating transients, etc., which again brings up the next embodiment of the invention.

In a third embodiment of the invention to make molecular scattering structures from assemblages of tungsten atoms surrounded by fluorine atoms, please refer to the body of literature on the electrical breakdown of gases. There are many electrical phenomena related to the electrical breakdown of gasses. The inventor had studied these references with respect to a different invention in the field of the biological sciences. Therefore, for reference to electrical breakdown of gasses and related phenomena, please refer the following references, entire copies of which are incorporated herein by reference: (a) the book entitled "Ionization and Breakdown in Gases", by F. Llewellyn-Jones, John Wiley & Sons, New York, N.Y., 1957; (b) the book entitled "Electrical Breakdown of Gases", by J. M. Meek and J. D. Craggs, Oxford at the Clarendon Press, London, Great Britain, 1953; (c) the book entitled "Ionized Gases", by A. von Engle, Oxford at the Clarendon Press, London, Great Britain, 1955; (d) the book entitled "Electronics Designers' Handbook", edited by Robert W. Landee, Donovan C. Davis, and Albert P. Albrecht, Second Edition, McGraw-Hill Book Company, New York, N.Y., 1977; (e) the book entitled "The Electric Arc", by J. M. Somerville, John Wiley & Sons, New York, N.Y., 1959; (f) the book entitled "Basic Processes of Gaseous Electronics", by Leonard B. Loeb, University of California Press, Berkeley, Calif., 1955; (g) the book entitled "Encyclopedia of Physics", edited by Robert M. Besancon, Van Nostrand Reinhold Company, New York, N.Y., 1966; (h) the book entitled "The Encyclopedia of Physics", Second Edition, edited by Robert M. Besancon, van Nostrand Reinhold Company, New York, N.Y., 1974; (i) the book entitled "Process Instruments and Controls Handbook", Third Edition, edited by Douglas M. Considine, McGraw-Hill Book Company, New York, N.Y., 1985; (j) the book entitled "Cold Cathode Discharge Tubes", by J. R. Acton and J. D. Swift, Academic Press, Inc., New York, N.Y., 1963; and (k) the book entitled "Electronics Engineers" Handbook", by Donald Fink, McGraw-Hill Book Company, New York, N.Y., 1975.

In relation to the above described third embodiment, a typical situation related to the electrical breakdown of gases involves a vacuum sealed apparatus having an anode, and a cathode, an intervening gas or gases, and a voltage source capable of applying a suitable voltage and supplying the required current to the anode and cathode. In principle, any voltage vs. time V(t), and any current vs. time I(t), may be conducted between the anode and cathode of such an apparatus. If the anode and cathode are made from tungsten materials, and if the intervening as is fluorine, preferably hot ionized fluorine, then in the event of electrical breakdown, assemblages of tungsten atoms are ejected from the anode and/or the cathode into the fluorine gas. Accordingly, this third embodiment uses the phenomenon of electrical breakdown and suitable anodes cathodes, etc. to make molecular scattering structures from assemblages of tungsten atoms surrounded by fluorine atoms.

In a fourth embodiment of the invention to make molecular scattering structures from assemblages of tungsten atoms surrounded by fluorine atoms, please refer to the body of literature on "sputtering". For example, please refer to the subsection entitled "Evaporation and Sputtering" on pages 447–449 of the book entitled "Experimental Atomic Physics", by G. P. Harnwell and J. J. Livingood, McGraw-Hill Book Company, New York, N.Y., 1933, an entire copy of which is incorporated herein by reference. The phenomenon of sputtering is used to coat various surfaces with metallic materials in industrial processes. In analogy with the above, this fourth embodiment uses the phenomenon of sputtering In a fifth embodiment, and in analogy to the above, an electric welder using a tungsten welding rod, a tungsten target, that is immersed in fluorine gas, preferably, hot fluorine gas, is used toto make molecular scattering structures from assemblages of tungsten atoms surrounded by fluorine atoms.

In a sixth embodiment, and in analogy to the above, tungsten dust is injected into a hot enclosure having heated fluorine gas, preferably ionized fluorine gas, that is used toto make molecular scattering structures from assemblages of tungsten atoms surrounded by fluorine atoms.

In the above enumerated embodiments, the material of tungsten is described. However, any of the above methods and apparatus may be used to surround any assemblage of metallic atoms with any variety of atoms in machines to make heavy gas and gas-like substances.

Different types of optical processes also include the specific use of a source of microwaves that replaces the laser 100 in FIG. 1 in another embodiment of the invention. The scattering of microwave energy from the masses within the vacuum tight cavity would be used to measure gravity. Of course, the cylindrical detectors 148, 150, 152 and 154 would have to be replaced with detectors sensitive to microwaves. This embodiment of the invention provides another method to measure density variations in a material. Any such embodiment provides another means to measure density variations in a material.

By analogy, in another embodiment, the laser would be replaced with a particle source, such as with a neutron source, and scatting of neutrons, and/or the absorption and re-emission of gamma rays could be used to measure gravity. Of course, the cylindrical detectors 148, 150, 152 and 154 would have to be replaced with detectors sensitive to the neutrons or gamma rays as the case may be. This embodiment of the invention provides another method to measure density variations in a material. Any such embodiment provides another means to measure density variations in a material.

In another embodiment of the invention, no laser is needed at all if black-body radiation is measured with the various optical detectors surrounding the vacuum tight cavity. However, the use of the external laser would in many embodiments improve the sensitivity and decrease the measurement time. This embodiment provides another method to measure density variations in a material. Any such embodiment provides another means to measure density variations in a material.

In another embodiment of the invention, no laser is needed but radioactive particles replace the AMS. Then, naturally occurring radioactive decay is measured to determine gravity. However, in this case, the cylindrical detectors 148, 150, 152 and 154 would have to be replaced with detectors sensitive to naturally occurring radioactive particles. This embodiment provides yet another method to measure density variations in a material. Any such embodiment provides another means to measure density variations in a material.

In another embodiment of the invention, no laser is needed but the electrical conductivity of the material measured to measure density variations in the material. The material may be either a gas or liquid. In this case, the cylindrical detectors 148, 150, 152 and 154 would have to be replaced with current and voltage measurement electrodes that are in electrical contact with the material. The conductivity is due to certain particles within the material carrying electricity. The conductivity is then measured to determine the distribution of masses, or density variations, of the particles within the material to in turn, measure gravity, as in other embodiments. This embodiment provides yet another method to measure density variations in a material. Any such embodiment provides another means to measure density variations in a material.

The immediately preceding preferred embodiment is just one example wherein the electrical conductivity measured is proportional to the distribution of masses and/or the density variations in the material. There are many different embodiments of the invention wherein the parameter that is measured is proportional to the distribution of masses and/or density variations. Electrical conductivity is one, the electrical resistivity is another, pressure is another, pressure variations within the vacuum tight cavity is another, pressure variations along the wall of the vacuum tight cavity is another, dielectric properties is another, permittivity is another, viscosity is yet another, etc. All of these parameters, conductivity, resistivity, etc., can be measured at one or more frequencies, where said measurements at different frequencies are either performed simultaneously or in sequence. In these embodiments of the invention, no laser is needed, but a parameter that is related to the distribution of masses and/or density variations is measured to measure the distribution of masses and/or density variations in the material. In this case, the cylindrical detectors 148, 150, 152 and 154 would have to be replaced with suitable detectors to measure the parameter chosen. The observed parameter is then measured to determine the distribution of masses and/or density variations in the material to in turn, measure gravity, as in other embodiments. Any such embodiment provides another method to measure density variations in a material to obtain information useful to measure gravity. Any such embodiment provides another means to measure density variations in a material to obtain information useful to measure gravity. Any such embodiment provides another method to measure the distribution of masses in a material to obtain information useful to measure gravity. Any such embodiment provides another means to measure the distribution of masses in a material to obtain information useful to measure gravity. Many such parameters are described in the following references, entire copies of which are incorporated herein by reference: (a) the book entitled "Experiments in Modern Physics", by Adrian Melissinos, Academic Press, New York, N.Y., 1966; (b) the book entitled "Introduction to Modern Physics", by F. K. Richtmyer and E. H. Kennard, McGraw-Hill Book Company, New York, N.Y., 1947; (c) the book entitled "The Encyclopedia of Physics", edited by Robert M. Besancon, 1966, op. cit; (d) the book entitled "Experimental Atomic Physics", by G. P. Harnwell and J. J. Livingood, 1933, op. cit.; (e) the book entitled "Principles of The Theory of Solids", by J. M. Ziman, Cambridge at the University Press, Cambridge, Great Britain, 1965; (f) the book entitled "Introduction to Solid State Physics", Fifth Edition, by Charles Kittel, John Wiley & Sons, New York, N.Y., 1976; (g) the book entitled "Medical Instrumentation, Application and Design", by John G. Webster, Houghton Mifflin Company, Boston, Mass., 1978; (h) the book entitled "Electronics Engineers' Handbook", by Donald Fink, 1975, op. cit.; (i) the book entitled "Process Instruments and Controls Handbook", Third Edition, by Douglas Considine, McGraw-Hill Book Company, New York, N.Y., 1985; (j) in the book entitled "Practical Instrumentation Transducers", a copy of which is not immediately available to applicant for proper reference herein; and in the other references already cited herein. Any observed parameter described in these references that can be used to determine the distribution of masses and/or density variations in the material to in turn, measure gravity, is another embodiment of the invention.

In summary, the invention of precision differential gravimeters and precision gravity gradiometers may be used to measure gravity in almost any situation. This includes on the surface of the earth, a laboratory, the solar system, interstellar space—virtually anywhere. While certain embodiments above have focused on measurements of gravity within a borehole for geophysical purposes, it is to be emphasized that the invention may be used to measure gravity almost anywhere. Applicant explicitly does not limit the use of the invention to measure gravity within boreholes, and it may be used in any location to measure gravity that may be further used as a scientific instrument to test the relevant fundamental laws of physics.

While the above description contains many specificities, these should not be construed as limitations on the scope of the invention, but rather as exemplification of preferred embodiments thereto. As have been briefly described, there are many possible variations. Accordingly, the scope of the invention should be determined not only by the embodiments illustrated, but by the appended claims and their legal equivalents.

What is claimed is:

1. A precision gravity gradiometer to determine the gravity gradient having optical measurement means, wherein said-optical measurement means possesses a gaseous medium comprised of gas molecules, whereby each gas molecule is comprised of one or more tungsten atoms substantially surrounded by fluorene atoms to make a molecular scattering structure, wherein said measurement means further possesses a light source producing light having at least one wavelength scattered by said molecular scattering structure, whereby said measurement means determines variations in the density of said gaseous medium that is used in part to determine the gravity gradient.

2. The method to determine the gravity gradient in a gaseous mixture having a first and second molecular species, wherein the mass of said first molecular species is greater than the mass of said second molecular species, wherein said second molecular species is a buffer gas provided to minimize spurious density variations, wherein the density variations in said first molecular species are measured to determine the gravity gradient.

3. The method in claim 2 wherein the first molecular species is comprised of assemblages of tungsten atoms surrounded by fluorine atoms.

4. The method in claim 3 wherein the second molecular species is helium.

* * * * *